United States Patent
Cysewski et al.

(10) Patent No.: US 11,230,380 B2
(45) Date of Patent: Jan. 25, 2022

(54) INTERIOR AIRCRAFT FRAME ASSEMBLY FOR FURNISHINGS

(71) Applicant: THE BOEING COMPANY, Chicago, IL (US)

(72) Inventors: Sean R. Cysewski, Snohomish, WA (US); Harold Erickson, Mukilteo, WA (US); Saif Sultan, Bothell, WA (US); Bejan B. Banihashemi, Seattle, WA (US); Kevin D. Prince, Lake Stevens, WA (US); Alex H. Demarne, Mountlake Terrace, WA (US)

(73) Assignee: THE BOEING COMPANY, Chicago, IL (US)

( * ) Notice: Subject to any disclaimer, the term of this patent is extended or adjusted under 35 U.S.C. 154(b) by 936 days.

(21) Appl. No.: 15/872,055

(22) Filed: Jan. 16, 2018

(65) Prior Publication Data

US 2019/0217938 A1    Jul. 18, 2019

(51) Int. Cl.
*B64D 11/00* (2006.01)
*B64C 1/06* (2006.01)
*B64D 11/06* (2006.01)

(52) U.S. Cl.
CPC .......... *B64D 11/0023* (2013.01); *B64C 1/061* (2013.01); *B64C 1/066* (2013.01); *B64D 11/0696* (2013.01)

(58) Field of Classification Search
CPC ... B64D 11/0696; B64D 11/0023; B64C 1/20; B64C 1/066; B64C 1/10
See application file for complete search history.

(56) References Cited

U.S. PATENT DOCUMENTS

| 5,085,382 | A | * | 2/1992 | Finkenbeiner | B64D 9/00 244/118.1 |
| 5,201,481 | A | * | 4/1993 | Hararat-Tehrani | B64C 1/10 244/118.1 |
| 7,713,009 | B2 | * | 5/2010 | Hudson | B64D 11/0696 410/105 |
| 8,727,686 | B2 | * | 5/2014 | Burd | B64D 11/0023 411/371.2 |
| 9,027,880 | B2 | * | 5/2015 | Breuer | B64D 11/0606 244/118.5 |
| 10,370,106 | B2 | * | 8/2019 | Papke | B64D 11/0023 |
| 10,377,494 | B2 | * | 8/2019 | Merrick | B64D 11/0023 |
| 10,430,548 | B2 | * | 10/2019 | Schaefer | B64C 1/08 |
| 2019/0031354 | A1 | * | 1/2019 | Heidtmann | B64C 1/20 |
| 2020/0079525 | A1 | * | 3/2020 | Bauers | B64D 47/00 |

OTHER PUBLICATIONS http://www.celcomponents.com/en/products/sandwich-panels, 2018.
http://www.virginia.edu/ms/research/wadley/thermal-management. html, Apr. 24, 2013.

* cited by examiner

*Primary Examiner* — Brian M O'Hara
(74) *Attorney, Agent, or Firm* — Marshall, Gerstein & Borun LLP

(57) ABSTRACT

A wall assembly for an interior of an aircraft includes a frame member secured within a cabin of the aircraft having a first side and a second opposing side. The assembly further includes a first decorative panel secured to the frame member on a first side of the frame and a second decorative panel secured to the frame member on a second side of the frame.

20 Claims, 9 Drawing Sheets

INTERIOR AIRCRAFT FRAME ASSEMBLY FOR FURNISHINGS

FIELD

This disclosure pertains to a structural member for application within an interior of an aircraft and more particularly a structural member for supporting interior furnishings such as a wall within an interior of a cabin of an aircraft and interconnection of the structural member with the aircraft.

BACKGROUND

Partitions or walls positioned within a cabin of a commercial aircraft have been constructed from a single large piece of composite material. The structure and aesthetic features associated with the partition or wall are part of the single large piece of composite material or is otherwise permanently attached to the structure. If anything related to the aesthetic features, for example, needs to be changed, even if the change is minor, such as the shape, significant design changes would be needed to accommodate the changes being made to the structural component. As a result, there is a need to separate the structural aspect of the structural component from that of the aesthetic aspect of the structural component so as to avoid significant design changes with respect to the structural aspect of the wall or partition, for example, when merely an aesthetic change is needed.

Partition or wall structures have been constructed with aluminum stiffening frames employed for a partition or wall. There is always a need for reduction in weight of a component within an aircraft so as to reduce operational costs.

Partition or wall structures are typically secured to seat track assemblies and the structure is positioned offset from alignment with the seat track assembly. This offset positioning requires a connection assembly to accommodate this offset connection. As a result, the connection assembly configuration adds additional weight to the aircraft in reduction in aircraft operation efficiency. The offset positioning and also does not provide for a direct load path line from the support structure to the securement at the seat track requiring additional reinforcement. As a result, there is a need to provide a more efficient connection assembly for connecting the partition or wall structure to the seat track.

SUMMARY

An example of a wall assembly for an interior of an aircraft includes a frame member secured within a cabin of the aircraft having a first side and a second opposing side. The assembly further includes a first decorative panel secured to the frame member on a first side of the frame and a second decorative panel secured to the frame member on a second side of the frame.

An example of a connector assembly for a wall assembly for an interior of an aircraft includes a first channel for holding a leg member of a frame member having a first side and a second opposing side including a first decorative panel releasably secured to the first side and a second decorative panel releasably secured to the second side. The first channel includes a first sidewall spaced apart from a second sidewall for receiving the leg member of the frame member and the first and second decorative panels between the first and second sidewalls. A first aperture is positioned extending through the leg member of the frame member and a second aperture is positioned extending through the first sidewall of the first channel and a third aperture is positioned extending through the second sidewall of the first channel. A bolt member extends through the first, second and third apertures for securing the leg member, the first decorative panel and the second decorative panel to the first channel. A seat track adapter associated with the first channel wherein the seat track adapter includes a head having a dimension smaller than an opening defined within a seat track.

The features, functions, and advantages that have been discussed can be achieved independently in various embodiments or may be combined in yet other embodiments further details of which can be seen with reference to the following description and drawings.

DESCRIPTION

Figure 1:
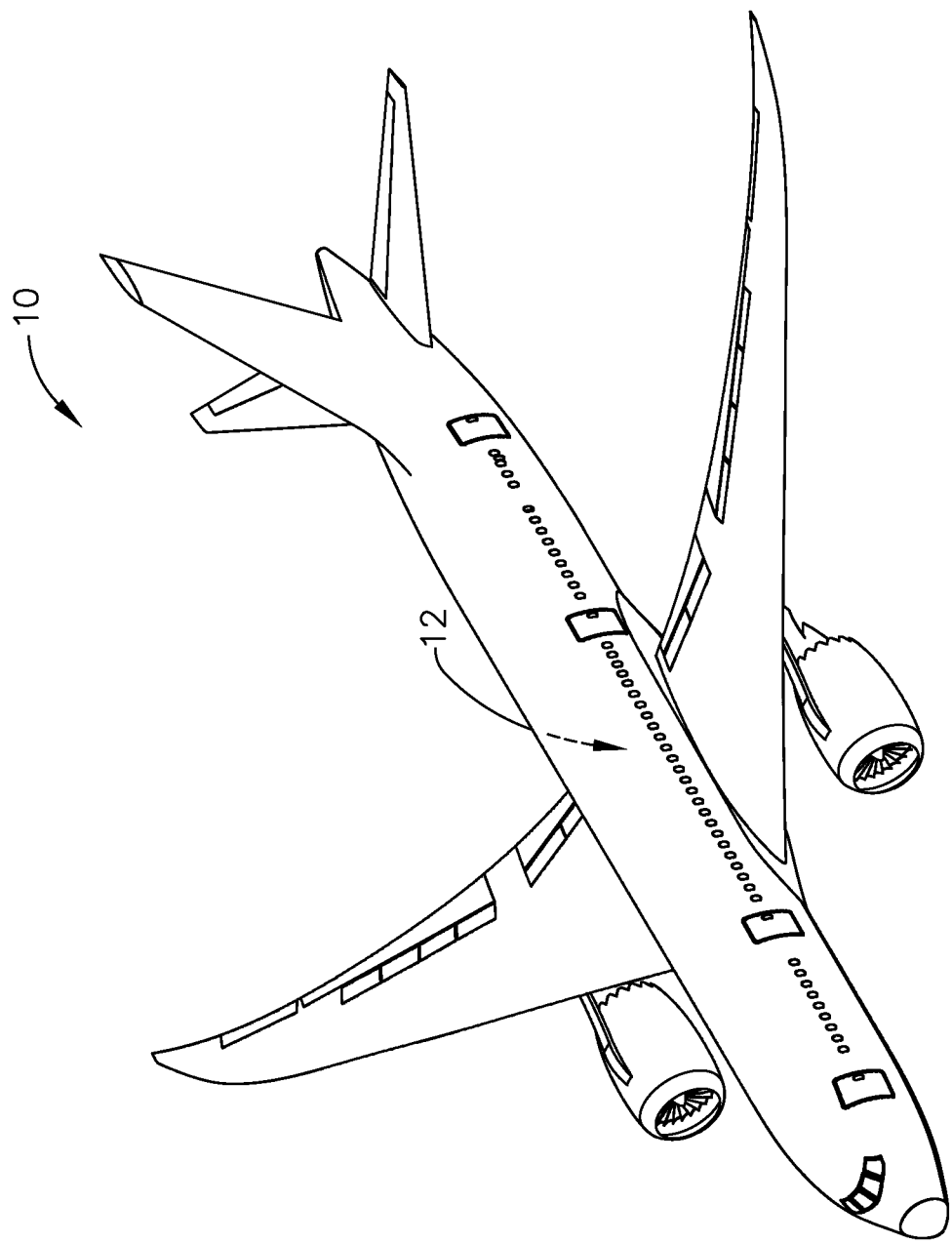
FIG. 1 is a perspective view of an aircraft.

In referring to FIG. 1 aircraft 10 has an interior cabin 12 which include wall or partition structures within the cabin to serve various purposes such as dividing the cabin for different class seating or separating the seating from a service area or from washroom facilities. The wall or partition structures within the cabin have been of a monolithic construction wherein the partition structure included as part of the structure a decorative aspect which was integral with the partition structure or permanently secured to the partition structure. This configuration of the partition made it difficult to change the decorative aspect of the interior cabin area wherein a new design of the structural partition would need to be made and installed within the cabin in order to change the aesthetic presentation of the partition or wall structure. This would be a costly and time consuming endeavor.

Figure 2:
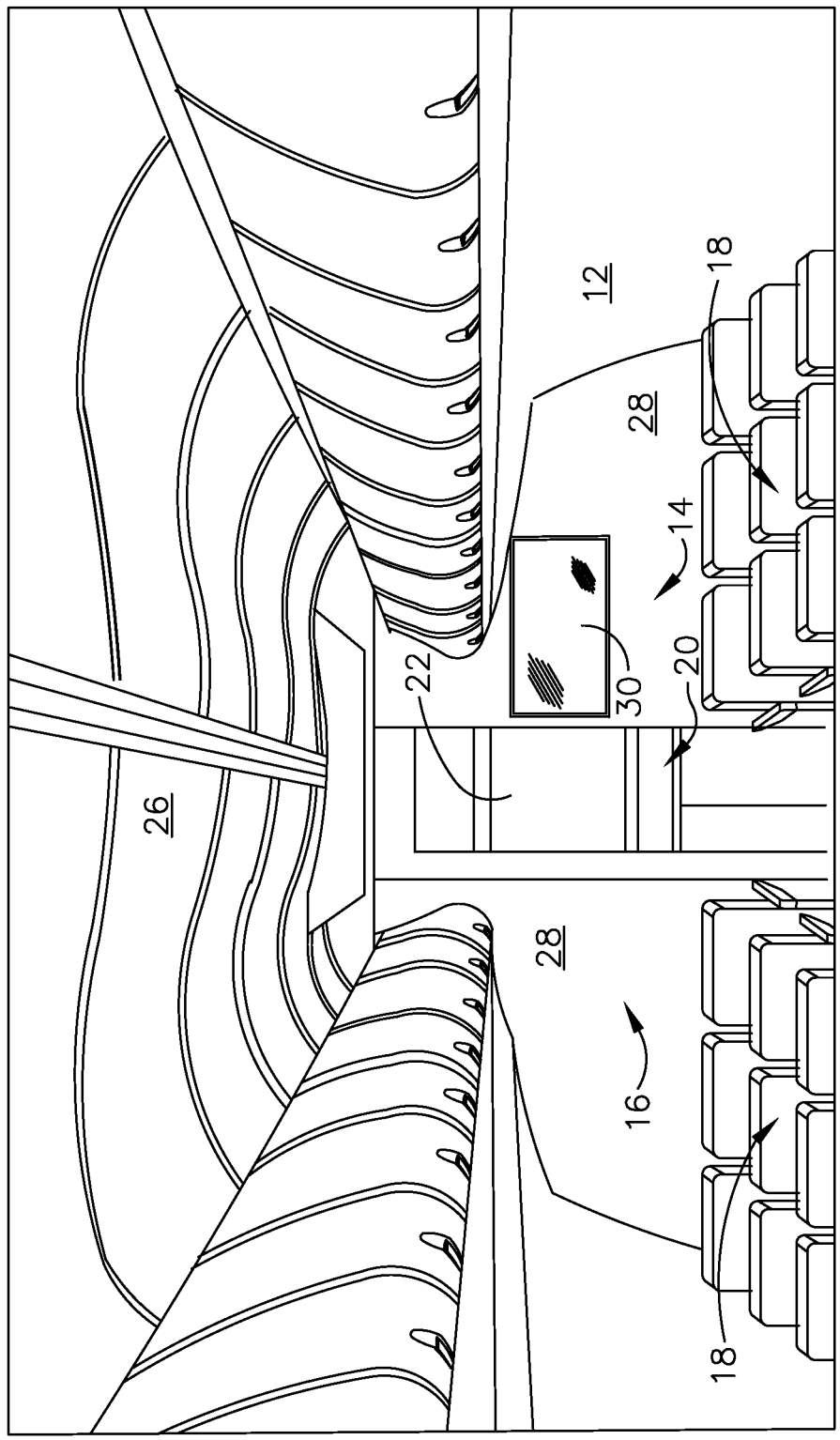
FIG. 2 is a perspective view in a forward direction within a cabin of the aircraft of FIG. 1.

As seen in FIG. 2, interior cabin 12 is shown in a view looking forward within aircraft 10. Examples of partitions 14 and 16 are seen in this example in a forward part of aircraft 10 wherein partitions 14 and 16 separate seating 18 from an attendant work area (not shown) positioned behind, in this example, partition 14 and from washroom facilities (not shown) positioned behind partition 16. As shown, passageway 20 leads to cockpit door 22 with seating 18 positioned aft of partitions 14 and 16. Partitions 14 and 16 extend from the floor (not shown) of cabin 12 to ceiling 26.

As will be discussed in more detail herein, partitions 14 and 16 have a decorative outer surface or covering layer 28 facing seating 18, for example, which provides an aesthetically desired appearance. This outer surface or covering layer 28 in some circumstances can also be positioned on an opposing side of partitions 14 and 16 as needed. Partitions 14 and 16 can carry and provide structural support for fixtures within cabin 12 such as basinets, television equipment, three dimensional logos or other items of utility for example. As seen in FIG. 2, a television 30 is secured to and supported by partition 14 which will be discussed in more detail herein.

Figure 3:
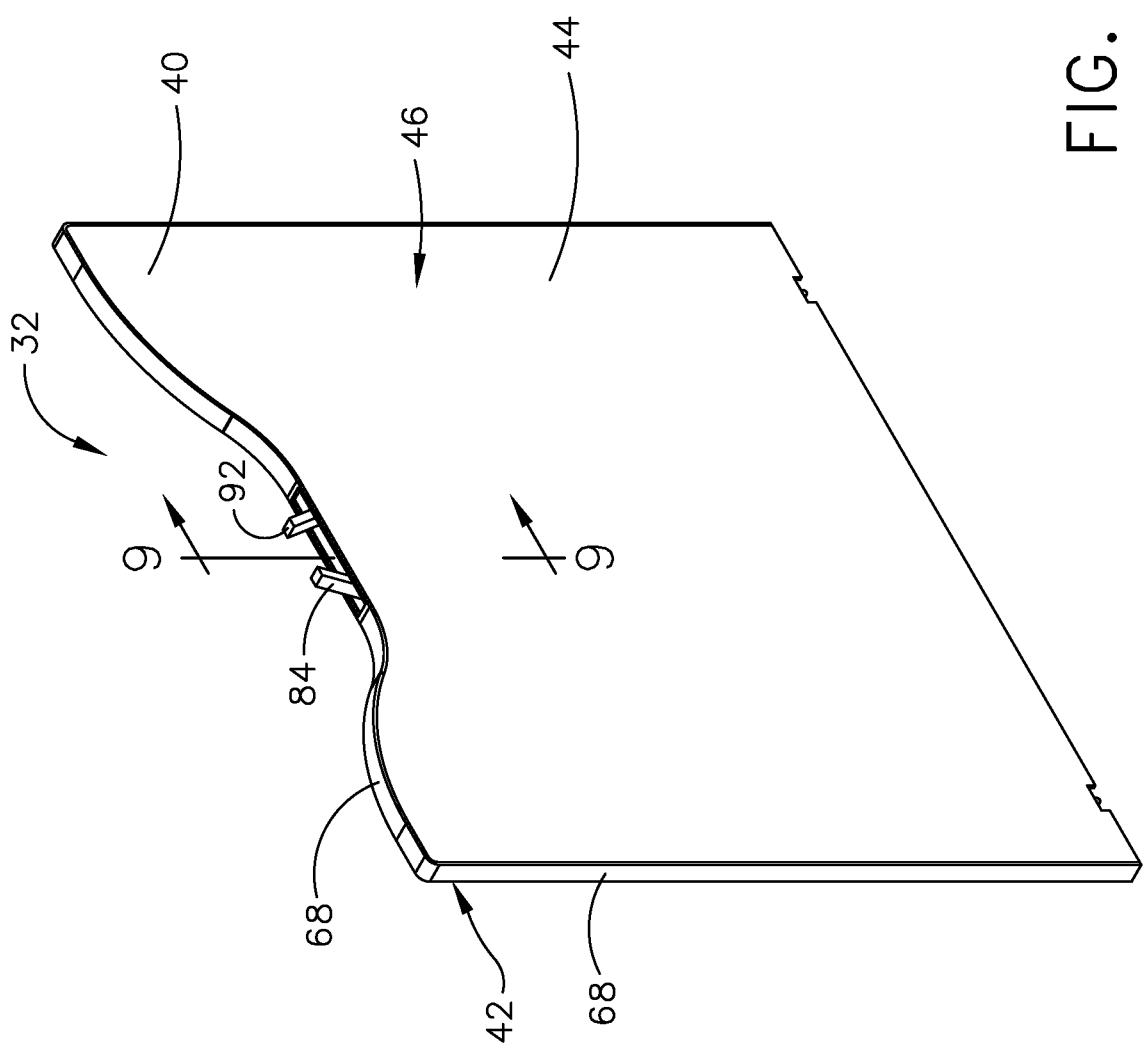
FIG. 3 is a schematic perspective view of a wall assembly for securement within an interior of the aircraft.
Figure 4:
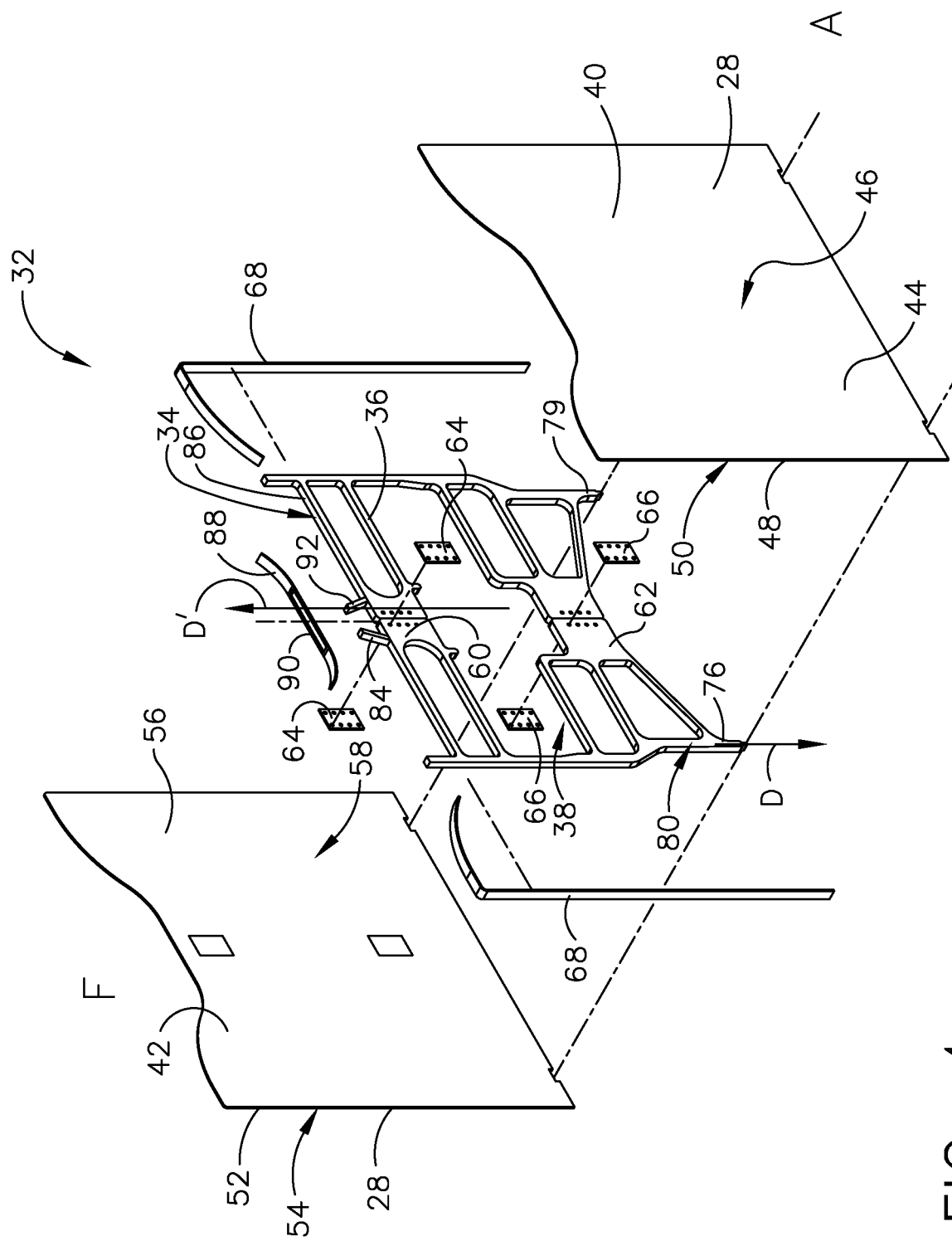
FIG. 4 is an exploded view of the wall assembly of FIG. 3.

An example of partition or wall 14 and 16 is shown in FIGS. 3 and 4 as wall assembly 32 which is secured, as will be discussed in more detail herein, within cabin 12 of an interior of aircraft 10 and provides structural support and provides for an easy change for aesthetic appearance. Wall assembly 32 shown in FIGS. 3 and 4 is an example and can take on one of a wide variety of shapes and sizes as needed to accommodate the needs presented for a particular cabin 12.

Wall assembly 32 includes frame member 34 having a first side 36 and a second opposing side 38. Frame member 34 advantageously is constructed of a composite material which, in this example, includes a layered construction which includes a honeycomb core (not shown) with a first face sheet positioned on first side 36 of frame member 34 and second face sheet positioned on second side 38 of frame member 34. This layered construction provides significant strength and can be made, as in this example, by way of routing frame member 34 from a sheet of the layered construction composite material so as to accommodate the size and shape of the location within cabin 12. Also, the configuration or shape of frame member 34 can be fabricated to accommodate the load line demands placed on frame member 34. The loads may be applied for example by way of a particular fixture that is secured to the frame and carried outside of wall assembly 32. Moreover, the composite layered construction provides for a significant reduction in weight in contrast to previous structural walls comprising solid composite with metallic reinforcement. The reduction of weight provided by the composite structure of frame member 34 provides a significant benefit to the operational costs of aircraft 10.

Wall assembly 32 further includes first decorative panel 40 secured to frame member 34 on first side 36 of frame member 34. Second decorative panel 42 is secured to frame member 34 on second side 38 of frame member 34. Similarly, with respect to frame member 34, first and second decorative panels 40 and 42 are also constructed of composite material. First decorative panel 40 includes a honeycomb core (not shown) with a first face sheet 44 positioned on first side 46 of first decorative panel 40 and a second face sheet 48 positioned on second opposing side 50 of the first decorative panel 40. Second decorative panel 42 includes honeycomb core (not shown) with first face sheet 52 positioned on first side 54 of second decorative panel 42 and second face sheet 56 positioned on second opposing side 58 of second decorative panel 42. First decorative panel 40 can carry, on an outer surface of first side 46, decorative outer surface or covering layer 28 as discussed earlier which is decorative in one or more of a variety of ways such as in coloring, design(s), surface texture, embossed surface etc. This similarly is the case in this example where second decorative panel 42 has decorative outer surface or covering layer 28 on first side 54 providing a decorative appearance in one or more of the variety of ways as mentioned above.

First decorative panel 40 is releasably secured to first side 36 of frame member 34 with at least one bolt (not shown). Second decorative panel 42 is releasably secured to second side 38 of frame member 34 with at least one bolt (not shown). Frame member 34 includes securement panels 60, 62 for receiving fasteners such as bolts which secure a fixture to wall assembly 32 with the fixture positioned on first side 36 and/or second side 38 of frame member 34. Fixtures, in this example, are bolted to frame member 34 and frame member 34 carries the load presented by the fixture. In referring to FIG. 9, an example of mounting a fixture to frame member 34 is shown. Fixture or television 30 is secured to frame member 34 wherein frame member 34 carries the load of television 30. As shown, mounting bracket 31 is secured to television 30 with bolts 33. Mounting bracket 31 is in turn secured to frame member 34 with bolt 35 with spacer 37 positioned between first decorative panel 40 and mounting bracket 31. In contrast, lighter loads such as branding for example can be directly attached to first and/or second decorative panels 40, 42. Lighter load items can be easily secured by one of a number of common ways of securement to first and/or second decorative panels 40, 42 in advance of mounting first and second decorative panels 40, 42 to frame member 34.

In the example of frame member 34 shown in FIG. 4, splice plate pair 64 and splice plate pair 66 are utilized in joining together portions of frame member 34 together. In instances where frame member 34 needs to be larger in dimension, portions of frame member 34 will be fabricated separately and subsequently joined together by way of use of pair of splice plates 64 and pair of splice plates 66 being bolted to the adjoin portions of frame member 34.

Figure 9:
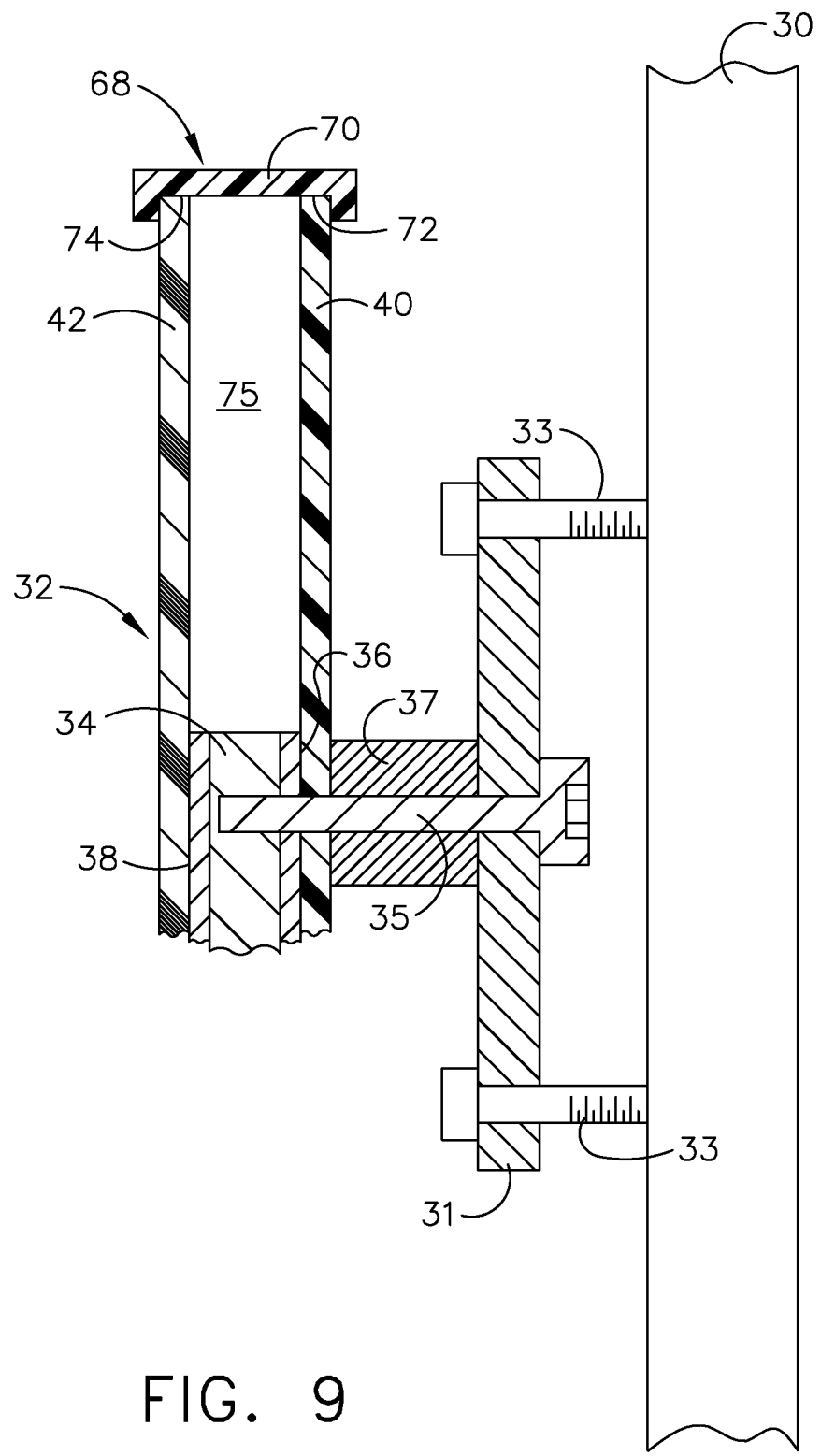
FIG. 9 is a cross section view taken along line 9-9 in FIG. 3 showing securement of a fixture to the wall assembly.

In further referring to FIG. 3, wall assembly 32 further includes trim member 68 which includes panel 70, as seen in FIG. 9. Panel 70 is positioned to extend over edge 72 of first decorative panel 40, extend from edge 72 to edge 74 of second decorative panel 42 and extend over edge 74 of second decorative panel 42. Panel 70 of trim member 68 also extends along edge 72 of first decorative panel 40 and edge 74 of second decorative panel 42 and encloses space 75 positioned between first and second decorative panels 40, 42 with frame member 34 positioned there between, as shown in FIGS. 3 and 4.

Spacing 75 positioned between first and second decorative panels 40, 42 can be used for extending and directing wiring as needed through wall assembly 32 providing the fabricator versatility of positioning wiring in contrast to having a solid wall structure which would require channeling being positioned within the solid wall structure at the time of fabrication of the solid wall structure. If needed, a channel or hole can be positioned through a part of frame member 34 allowing wires to pass through frame 34, if needed.

Figure 5:
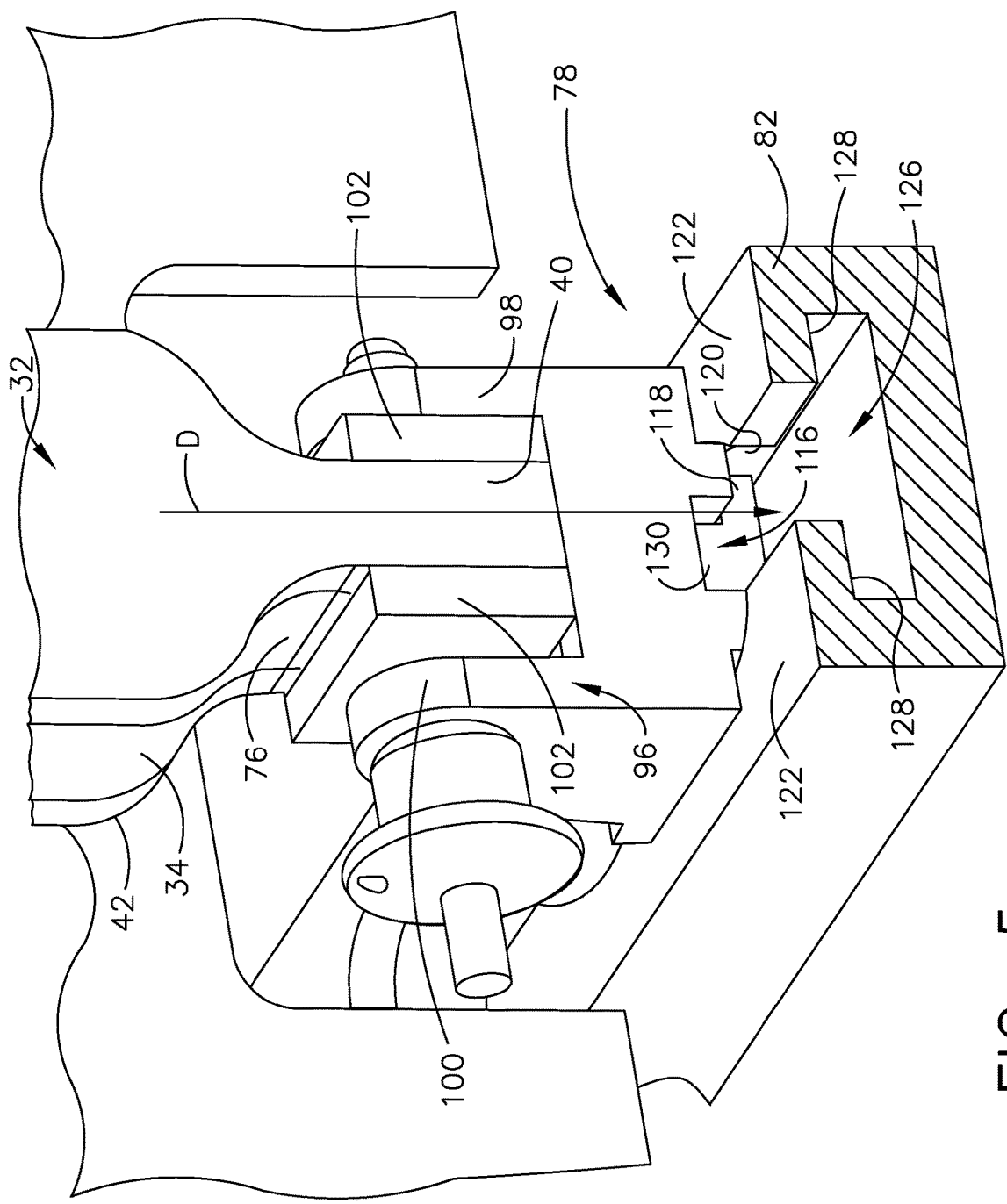
FIG. 5 is a partial perspective view of a connector assembly connecting the wall assembly of FIG. 3 within the interior of the aircraft to a seat track.

In referring to FIG. 4, frame member 34 includes leg member 76 which extends from frame member 34 and is releasably secured to a connector assembly 78 which is shown in FIG. 5 and will be discussed in further detail herein. In this example, frame member 34 includes leg member 76 and second leg member 79 spaced apart from leg member 76. Leg member 76 extends within a plane defined by frame member 34 providing a planar load path from frame member 34 through leg member 76. Leg member 76 extends from first end 80 of frame member 34 in direction D aligned with seat track 82 of aircraft 10 as seen in FIG. 5. With this configuration of leg member 76 with frame member 34 a direct load path is created from frame member 34 through leg 76 to seat track 82.

Figure 8:
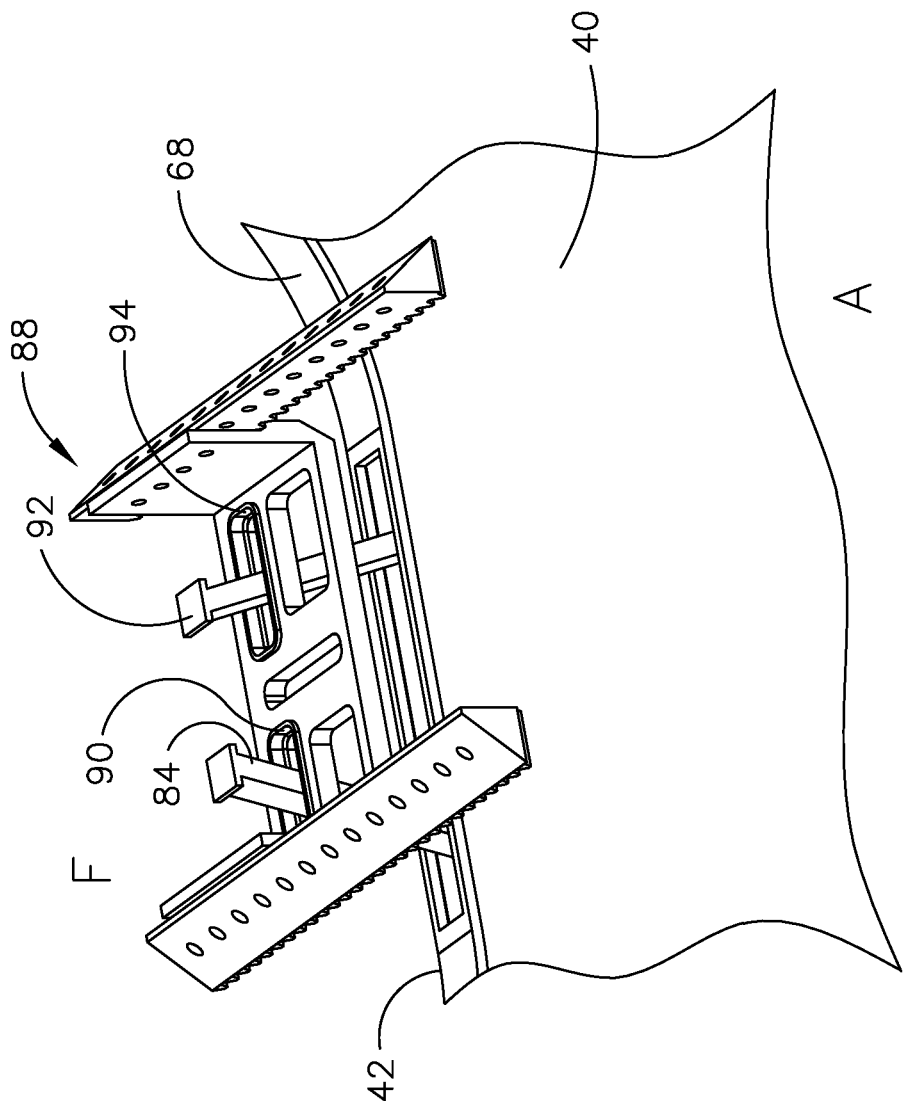
FIG. 8 is a partial view of an upper portion of the wall assembly of FIG. 3 interconnected with a ceiling support assembly.

Wall assembly 32 includes frame member 34. Arm member 84 extends within plane defined by frame member 34 in an opposing direction D' than leg 76 as seen in FIG. 4. Arm member 84 extends from second end 86 of frame member 34 aligned with ceiling support rail assembly 88. Arm member 84 engages slot 90 within ceiling support rail assembly 88 which restrains movement of arm member 84 in forward F and aft A directions thereby maintaining wall assembly stabilized in the forward F and aft A directions as seen in FIGS. 4 and 8. Second arm member 92 is also connected to frame member 34 and extends through second slot 94 as seen in FIG. 8.

Figure 6A:
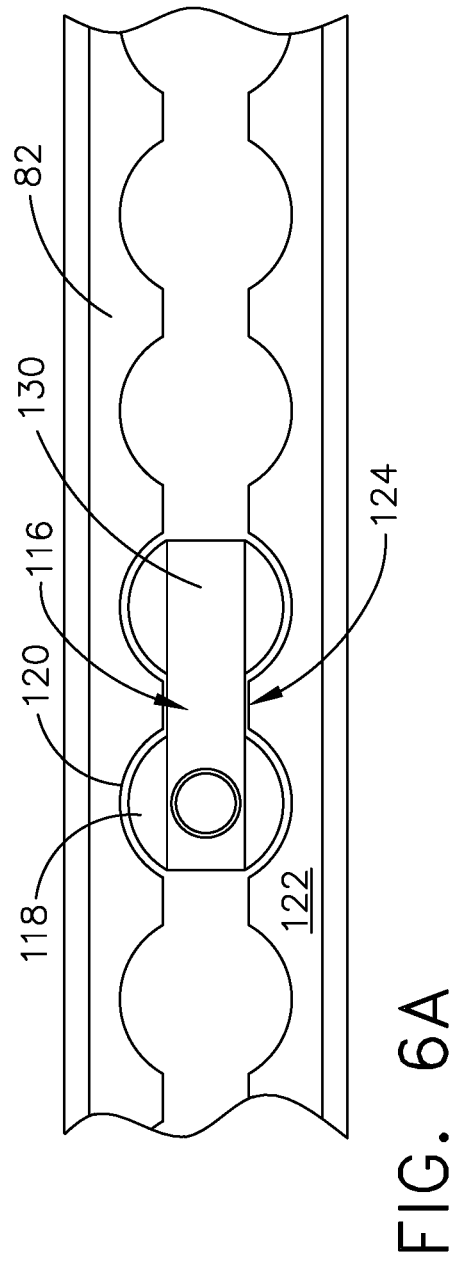
FIG. 6A is a partial top plan view of the seat track of FIG. 5 with a seat track adapter of the connector assembly inserted into the seat track.
Figure 6B:
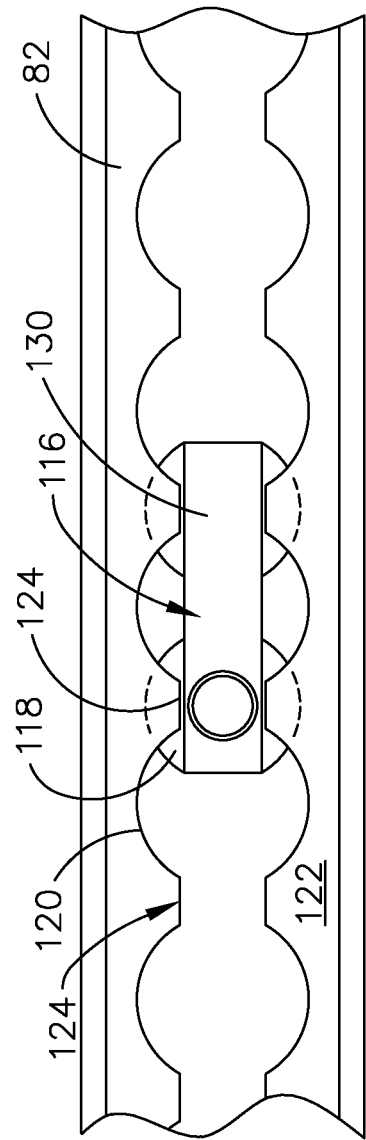
FIG. 6B is the view of FIG. 6A with the seat track adapter positioned in a securement position.
Figure 7:
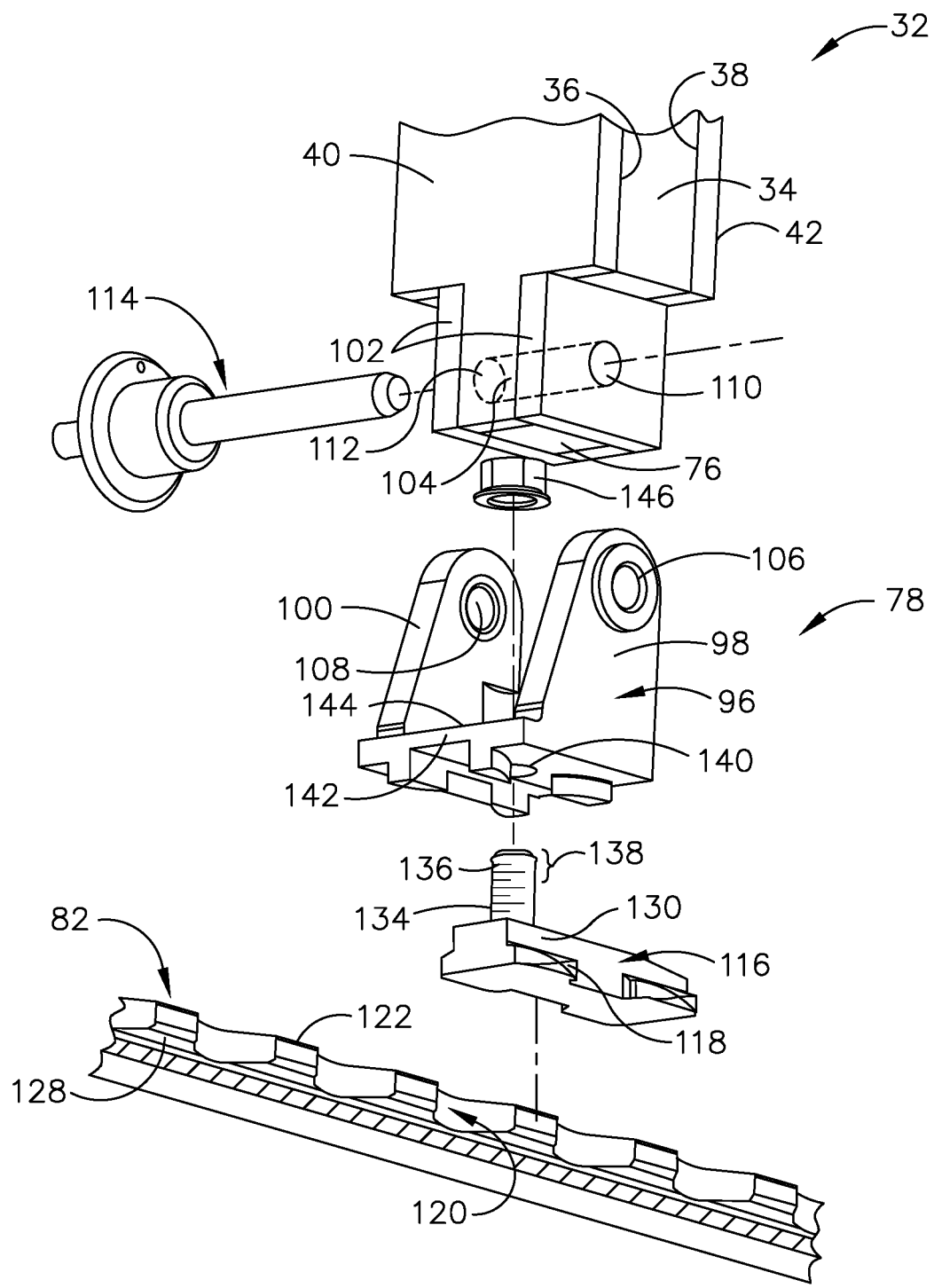
FIG. 7 is a perspective exploded view of the connector assembly of FIG. 5 and a partial broken away view of the seat track.

In referring to FIGS. 5-7, connector assembly 78 for wall assembly 32 for an interior of aircraft 10 is shown which provides a direct load path connection between wall assembly 32 and seat track 82 which is in turn connected to aircraft 10. As will be seen, connector assembly 78 provides a direct load path between wall assembly 32 and seat track 82 which reduces the weight of a connector assembly that would otherwise provide an indirect load path and provides a more desired connection in transference of load. Connector assembly 78 includes first channel 96 for holding leg member 76 of frame member 34 having first side 36 and second opposing side 38 and holding first decorative panel 40 releasably secured to the first side 36 and second decorative panel 42 releasably secured to second side 38. First channel 96 includes first sidewall 98 spaced apart from second sidewall 100 for receiving leg member 76 of frame member 34 and first and second decorative panels 40, 42 between the first and second sidewalls 98, 100.

In this example, as seen in FIGS. 6A, 6B and 7, leg member 76 and first and second decorative panels 40, 42 are positioned in between pair of securement plates 102 with leg member 76 and first and second decorative panels 40, 42 positioned within first channel 96. First aperture 104 is positioned extending through leg member 76 of frame member 34. Second aperture 106 is positioned extending through first sidewall 98 of first channel 96 and third aperture 108 is positioned extending through second sidewall 100 of first channel 96. In this example, pair of securement plates 102 each define fourth aperture 110 and fifth aperture 112 which extend through pair of securement plates 102. Bolt member 114 extends through first, second, third, fourth and fifth apertures 104, 106, 108, 110 and 112 for securing leg member 76 of frame member 34, first decorative panel 40 and second decorative panel 42 to first channel 96. Seat track adapter 116 is associated with first channel 96 wherein seat track adapter 116 includes head 118 having a dimension smaller than opening 120 defined within seat track 82.

First channel 96 is positioned in overlying relationship to first side 122 of seat track 82 within aircraft 10. Seat track 82 defines slot 124, as seen in FIGS. 6A and 6B which is in communication with opening 120 wherein slot 124 has a smaller dimension than opening 120. Seat track 82 defines second channel 126, as seen in FIG. 5 positioned on second side 128 opposing first side 122 of seat track 82 and in communication with opening 120 and slot 124. Seat track adapter 116 further includes rail 130 which extends along one side 132 of head 118. Rail 130 has a dimension less than a dimension of slot 124. With head 118 positioned through opening 120 head 118 is positioned within second channel 126 of seat track 82, as seen in FIG. 6A, head 118 can then be positioned out of alignment with opening 120, as seen in FIG. 6B, and aligned with slot 124 such that rail 130 is positioned within slot 124 and seat track 82 which defines slot 124 restricts movement of head 118, having a greater dimension than slot 124, from moving through slot 124 and out of engagement with seat track 82.

Rail 130 further includes shaft 134 extending away from rail 130 and seat track 82 wherein shaft 134 defines threads 136 on a portion 138 of shaft 134 distal from rail 130. Shaft 134 extends through sixth aperture 140 defined by base 142 of the first channel 96 which extends between the first and second sidewalls 100, 102 of first channel 96 with first channel 96 positioned in overlying relationship with seat track 82 as seen in FIGS. 5-7. Threads 136 are positioned on side 144 of base 142 which faces away from seat track 82 with first channel 96 positioned in overlying relationship to seat track 82. Further included is nut 146 positioned on threads 136 of shaft 134 providing a compression securement to seat track 82 between head 118 of seat track adapter 116 and first channel 96 resulting in securement of first channel 96 to seat track 82.

While various embodiments have been described above, this disclosure is not intended to be limited thereto. Variations can be made to the disclosed embodiments that are still within the scope of the appended claims.

What is claimed:

1. A wall assembly for an interior of an aircraft, comprising:
    a frame member secured within a cabin of the aircraft having a first side and a second opposing side, wherein:
        the frame member defines openings, which extend through the frame member and are spaced apart from one another along the frame member; and
        the frame member comprises a leg member which extends within a first channel comprising a first sidewall and a second sidewall, which are spaced apart with a base extending between the first sidewall and the second sidewall, such that the leg member is secured to the first sidewall and the second sidewall and the leg is aligned with the base;
    a seat track adapter releasably secured to the base of the first channel such that the base aligns with the seat track adapter and the seat track with the seat track adapter secured to a seat track;
    a first decorative panel secured to the frame member on the first side of the frame member; and
    a second decorative panel secured to the frame member on the second side of the frame member.

2. The wall assembly of claim 1, wherein the frame member is constructed of a composite material.

3. The wall assembly of claim 2, wherein the frame member is constructed of a honeycomb core with a first face sheet positioned on the first side of the frame member and a second face sheet positioned on the second side of the frame member.

4. The wall assembly of claim 1, wherein the first and second decorative panels are constructed of composite material.

5. The wall assembly of claim 4, wherein:
    the first decorative panel comprises a honeycomb core with a first face sheet positioned on a first side of the first decorative panel and a second face sheet positioned on a second opposing side of the first decorative panel; and
    the second decorative panel comprises a honeycomb core with a first face sheet positioned on a first side of the second decorative panel and a second face sheet positioned on a second opposing side of the second decorative panel.

6. The wall assembly of claim 1, wherein:
the first decorative panel is releasably secured to the first side of the frame member with at least one bolt; and
the second decorative panel is releasably secured to the second side of the frame member with at least one bolt.

7. The wall assembly of claim 1, wherein the frame member comprises a securement panel for securing a fixture positioned on the first side or the second side of the frame member.

8. The wall assembly of claim 1, wherein the frame member comprises a leg member which extends from the frame member and is releasably secured to a seat track adapter assembly.

9. The wall assembly of claim 8, wherein the leg member extends within a plane defined by the frame member.

10. The wall assembly of claim 8, wherein the leg member extends from a first end of the frame member in a direction aligned with a seat track of the aircraft.

11. The wall assembly of claim 8, wherein the frame member comprises an arm member which extends within a plane defined by the frame member.

12. The wall assembly of claim 11, wherein the arm member extends from a second end of the frame member in a direction aligned with a ceiling support rail.

13. The wall assembly of claim 12, wherein the arm member engages a slot within the ceiling support rail which restrains movement of the arm member in a forward and aft directions of the aircraft.

14. The wall assembly of claim 1, further includes a trim member which includes a panel positioned to extend over an edge of the first decorative panel, extend from the edge of the first decorative panel to an edge of the second decorative panel, extend over the edge of the second decorative panel and extend along the edge of the first decorative panel and the edge of the second decorative panel.

15. A connector assembly for a wall assembly for an interior of an aircraft, comprising:
a first channel for holding a leg member of a frame member having a first side and a second opposing side including a first decorative panel releasably secured to the first side and a second decorative panel releasably secured to the second side, wherein:
the first channel comprises a first sidewall spaced apart from a second sidewall with a base extending between the first sidewall and the second sidewall, such that the leg member of the frame member and the first and second decorative panels extend between the first and second sidewalls and the leg member is secured to the first and second sidewalls and is aligned with the base;
a first aperture is positioned extending through the leg member of the frame member;
a second aperture is positioned extending through the first sidewall of the first channel and a third aperture is positioned extending through the second sidewall of the first channel;
a bolt member extends through the first, second and third apertures for securing the leg member, the first decorative panel and the second decorative panel to the first channel; and
a seat track adapter releasably secured to the base of the first channel wherein the seat track adapter comprises a head having a dimension smaller than an opening defined within a seat track.

16. The connector assembly of claim 15, wherein:
the first channel is positioned in overlying relationship to a first side of a seat track within the aircraft;
the seat track defines a slot in communication with the opening;
the slot has a smaller dimension than the opening; and
the seat track defines a second channel positioned on a second side opposing the first side of the seat track and in communication with the opening and the slot.

17. A connector assembly for a wall assembly for an interior of an aircraft, comprising:
a first channel for holding a leg member of a frame member having a first side and a second opposing side including a first decorative panel releasably secured to the first side and a second decorative panel releasably secured to the second side, wherein:
the first channel comprises a first sidewall spaced apart from a second sidewall for receiving, the leg member of the frame member and the first and second decorative panels between the first and second sidewalls;
a first aperture is positioned extending through the leg member of the frame member;
a second aperture is positioned extending through the first sidewall of the first channel and a third aperture is positioned extending through the second sidewall of the first channel;
a bolt member extends through the first, second and third apertures for securing the leg member, the first decorative pane and the second decorative panel to the first channel; and
a seat track adapter releasably secured to the first channel wherein the seat track adapter comprises a head having a dimension smaller than an opening defined within a seat track, wherein:
the first channel is positioned in overlying relationship to a first side of the seat track within the aircraft;
the seat track defines a slot in communication with the opening;
the slot has a smaller dimension than the opening; and
the seat track defines a second channel positioned on a second side opposing the first side of the seat track and in communication with the opening and the slot
the seat rack adapter further includes a rail which extends along one side of the head;
the rail has a dimension less than a dimension of the slot;
with the head positioned aligned with the opening, the head is removable from the second channel of the seat track, and with the head positioned out of alignment with the opening and aligned with the slot, the slot restricts movement of the head, having a greater dimension than the slot, from moving through the slot and out of the seat track.

18. The connector assembly of claim 17, the rail further includes a shaft extending away from the rail and the seat track wherein the shaft defines threads on a portion of the shaft distal from the rail.

19. The connector assembly of claim 18, wherein the shaft extends through a sixth aperture defined by a base of the first channel, which extends between the first and second sidewalls of the first channel, with the base of the first channel positioned in overlying relationship with the seat track.

20. The connector assembly off claim 19, wherein:
with the threads of the shaft positioned beyond the base, wherein the threads are positioned on a side of the base which faces away from the seat track and with the first channel positioned in overlying relationship to the seat track, a nut positioned on the threads of the shaft provides a compression securement to the seat track positioned between the head of the seat track adapter and the base of the first channel.

* * * * *

UNITED STATES PATENT AND TRADEMARK OFFICE
CERTIFICATE OF CORRECTION

| | | |
|---|---|---|
| PATENT NO. | : 11,230,380 B2 | Page 1 of 1 |
| APPLICATION NO. | : 15/872055 | |
| DATED | : January 25, 2022 | |
| INVENTOR(S) | : Sean R. Cysewski et al. | |

It is certified that error appears in the above-identified patent and that said Letters Patent is hereby corrected as shown below:

In the Claims

At Column 8, Line 27, "pane" should be -- panel --.

At Column 8, Line 37, "opening; and" should be -- opening; --.

At Column 8, Line 40, "the slot" should be -- the slot; --.

At Column 8, Line 41, "rack" should be -- track --.

At Column 8, Line 44, "slot;" should be -- slot; and --.

At Column 8, Line 61, "off claim" should be -- of claim --.

Signed and Sealed this
Fifth Day of July, 2022

Katherine Kelly Vidal
*Director of the United States Patent and Trademark Office*